United States Patent
Yang et al.

(10) Patent No.: US 12,168,975 B2
(45) Date of Patent: Dec. 17, 2024

(54) SHAPE MEMORY ACTUATOR AND METHOD OF MAKING SAME

(71) Applicant: SMARTER ALLOYS INC., Cambridge (CA)

(72) Inventors: David Yang, Cambridge (CA); Jaideep Singh, Cambridge (CA); Siu Kei Tang, Cambridge (CA); Jak Li, Cambridge (CA); Alanna Pouw, Cambridge (CA); Ibrahem Khan, Cambridge (CA); Michael Kuntz, Cambridge (CA)

(73) Assignee: SMARTER ALLOYS INC., Cambridge (CA)

( * ) Notice: Subject to any disclaimer, the term of this patent is extended or adjusted under 35 U.S.C. 154(b) by 0 days.

(21) Appl. No.: 17/411,558

(22) Filed: Aug. 25, 2021

(65) Prior Publication Data

US 2022/0065233 A1     Mar. 3, 2022

Related U.S. Application Data

(60) Provisional application No. 63/070,029, filed on Aug. 25, 2020.

(51) Int. Cl.
    *F03G 7/06*           (2006.01)

(52) U.S. Cl.
    CPC ......... *F03G 7/0614* (2021.08); *F03G 7/0616* (2021.08)

(58) Field of Classification Search
    CPC .............................. F03G 7/0614; F03G 7/0616
    See application file for complete search history.

(56) References Cited

U.S. PATENT DOCUMENTS

| | | | | |
|---|---|---|---|---|
| 5,114,504 A | * | 5/1992 | AbuJudom, II | C22F 1/006 |
| | | | | 420/451 |
| 2005/0199845 A1 | * | 9/2005 | Jones | F16K 15/035 |
| | | | | 251/129.06 |

(Continued)

FOREIGN PATENT DOCUMENTS

JP          H108168 A   *   1/1998

OTHER PUBLICATIONS

Site preference of ternary alloying additions to NiTi_ Fe, Pt, Pd, Au, Al, Cu, Zr and Hf (Year: 2004).*
English Translation JPH108168A (Year: 1998).*

*Primary Examiner* — Shafiq Mian
(74) *Attorney, Agent, or Firm* — Gowling WLG (Canada) LLP

(57) ABSTRACT

A shape memory actuator including: a nickel-titanium (NiTi) alloy; and a ternary element provided to the nickel-titanium alloy such that the content of the ternary element in the alloy is selected and processed based on a predetermined operating temperature for the actuator. The ternary element may be selected from at least one of lead (Pd), Gold (Au), Platinum (Pt), Hafnium (Hf) and Zirconium (Zr). A method of making a shape memory alloy (SMA) actuator, the method including: preparing an SMA material; cutting the SMA material into the shape for the actuator; and processing a predetermined portion of the actuator via laser processing such that at least some material properties of the SMA material are altered to provide an altered transformation temperature. In some cases, the processing may be configured to adjust the relative amount of at least a ternary element in the predetermined portion.

9 Claims, 6 Drawing Sheets

(56) References Cited

U.S. PATENT DOCUMENTS

2009/0250952 A1* 10/2009 Niskanen ............ E05B 47/0009
292/341.15
2020/0047875 A1* 2/2020 Calkins ................ B64C 21/025

* cited by examiner

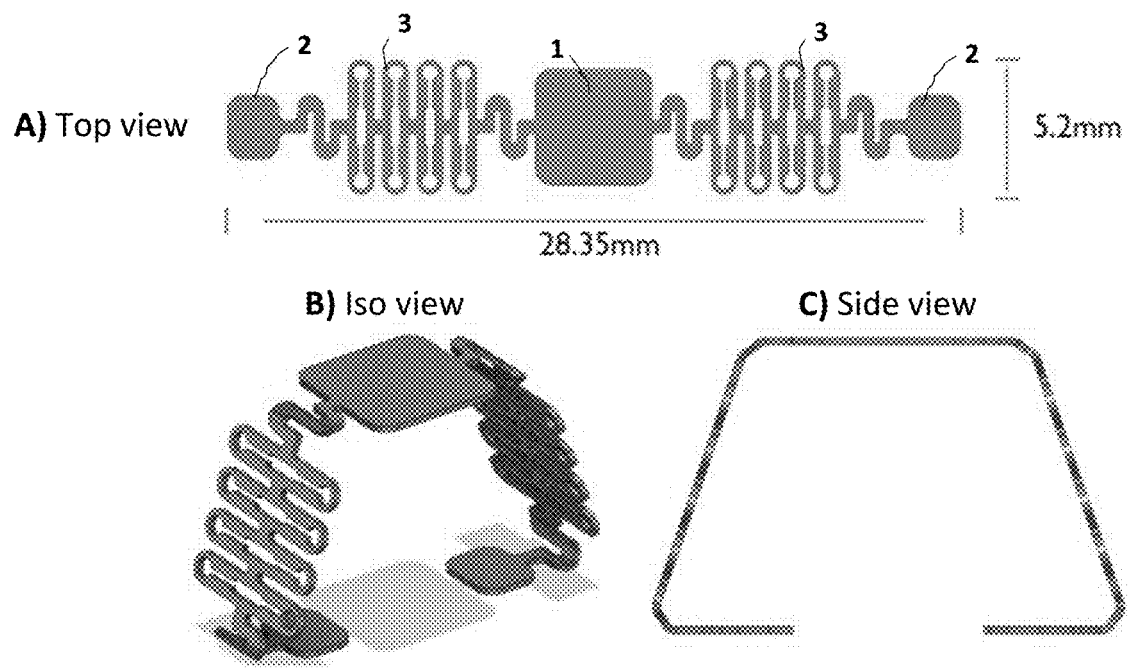
Figure 8
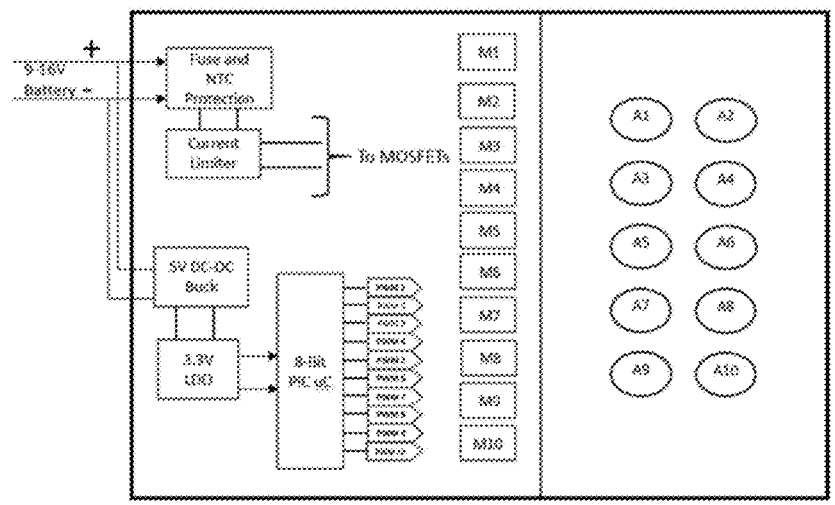
Figure 9
| Material | Martensitic finish temperature (°C) | Ultimate Tensile Strength (MPa) | Strain to Failure (%) |
|---|---|---|---|
| 13% Hf NiTi | < -75 | - | - |
| 13% Hf NiTi (heat treated) | -20 | - | - |
| 13% Hf NiTi (laser processed) | 125 | 503 | 10 |
| 20% Hf NiTi (heat treated) | 106 | 798 | 7 |
Figure 10

SHAPE MEMORY ACTUATOR AND METHOD OF MAKING SAME

RELATED APPLICATIONS

This application claims the benefit of priority to U.S. Provisional Patent App. No. 63/070,029, filed Aug. 25, 2020, the content of which is hereby incorporated herein by reference.

FIELD

This document relates to shape memory actuators and a method of making same, and, in particular to shape memory actuators that operate at a higher temperature than would be typical for shape memory alloys and a method of making the shape memory actuator.

BACKGROUND

As conventional shape memory alloys (SMA) continue to show promise for many actuation applications, there is an increased demand for providing SMA actuators that can operate at higher transformation temperatures. To address this, many different alloying elements have been investigated including lead (Pd), Gold (Au), Platinum (Pt), Hafnium (Hf) and Zirconium (Zr). At levels >10 at. %, these elements have been shown to increase the transformation temperature of NiTi alloys, enabling their use in environments such as those demanded by many aerospace, automotive and energy applications. Although these ternary alloys may increase the operating temperature range, they can be very cost prohibitive, and this often comes with a trade-off in work output.

Additionally, most SMA actuator applications require the control of the actuator by means of electric current. In order to control and supply a current, the SMA must be connected to some form of control board. Since most SMAs are very limited in solderability, current methods for securing SMAs to a control board, such as crimping and welding, have limitations in terms of repeatability and scalability (and can also be time-prohibitive and labour intensive). Often the addition of alloying elements further reduces the joinability of these alloys which is partly attributed to the formation of brittle phases caused within the microstructure. These phases can cause failure during crimping or become more prominent after welding procedures.

As such, there is a need for improved SMA actuators and methods of making same.

SUMMARY

According to an aspect herein, there is provided a shape memory actuator comprising a ternary element in addition to nickel and titanium and the content of the ternary element is selected and processed based on predetermined operating temperature for the actuator. In some cases, the ternary element maybe be Hafnium (Hf). In some cases, the Hafnium may have a content of 13 at. % and be treated/processed to increase the transformation temperature above what would be typical for Hf NiTi at 13 at. %.

According to another aspect herein, there is provided a method of making a shape memory actuator comprising: preparing an SMA material (such as an Hf NiTi material); cutting the SMA material (typically using a cutting laser or the like) into the shape for the actuator; and processing a predetermined portion or area of the SMA material or the actuator via laser processing such that at least some material properties of the SMA material are changed/altered. In some cases, the processing acts on the predetermined portion to provide an adjusted or predetermined content of Hf, Ni, Ti, (relative content or amount of each element) in the predetermined portion such that the transformation temperature is adjusted.

According to another aspect herein, there is provided a shape memory actuator including: a nickel-titanium (NiTi) alloy; and a ternary element provided to the nickel-titanium alloy such that the content of the ternary element in the alloy is selected and processed based on a predetermined operating temperature for the actuator.

In some cases, the ternary element may be Hafnium (Hf). In this case, the nickel-titanium alloy may have a relative Hafnium content of 13 at. % and be processed to increase the transformation temperature above what would be typical for Hf NiTi at 13 at. %. Also in this case, the alloy may have a relative Hafnium content of 13 at. % and be processed to increase the local relative Hafnium content in a predetermined portion of the alloy to above 20 at. %.

In some cases, the ternary element may be selected from at least one of lead (Pd), Gold (Au), Platinum (Pt), Hafnium (Hf) and Zirconium (Zr).

In some cases, the NiTi alloy may be bonded to electrical contacts by a mechanical connection. In this case, the mechanical connection may be crimping or the like.

According to another aspect herein, there is provided a method of making a shape memory alloy (SMA) actuator, the method including: preparing an SMA material; cutting the SMA material into the shape for the actuator; and processing a predetermined portion of the actuator via laser processing such that at least some material properties of the SMA material are altered to provide an altered transformation temperature.

In some cases, the processing may be configured to adjust the relative amount of at least a ternary element in the predetermined portion such that the transformation temperature for the predetermined portion is different from other portions of the actuator.

In some cases, the ternary element may be selected from at least one of lead (Pd), Gold (Au), Platinum (Pt), Hafnium (Hf) and Zirconium (Zr).

In some cases, the SMA material may include a ternary element of Hafnium and may have a relative Hafnium content of 13 at. % and the processing is configured to increase the transformation temperature in the predetermined portion above what would be typical for Hf NiTi at 13 at. %.

In some cases, the SMA material may include a ternary element of Hafnium and may have a relative Hafnium content of 13 at. % and the processing is configured to increase the relative Hafnium content to higher than 20 at. % in the predetermined portion.

In some cases, the cutting may be performed using a cutting laser.

In some cases, the SMA material may be bonded to electrical contacts using a mechanical connection.

Other aspects and features of the invention will become apparent, to those ordinarily skilled in the art, upon review of the following description of some exemplary embodiments.

BRIEF DESCRIPTION OF FIGURES

The drawings included herewith are for illustrating various examples of articles, methods, and apparatuses of the present specification and are not intended to limit the scope of what is taught in any way. In the drawings:

FIG. 8 shows a simplified schematic drawing of an SMA actuator of the type shown in FIG. 7.

FIG. 9 shows an embodiment of an electrical schematic for a printed circuit board used to control an actuator according to embodiments herein.

FIG. 10 shows a chart comparing characteristics of different types of Hf NiTi materials.

DETAILED DESCRIPTION

Figure 1:
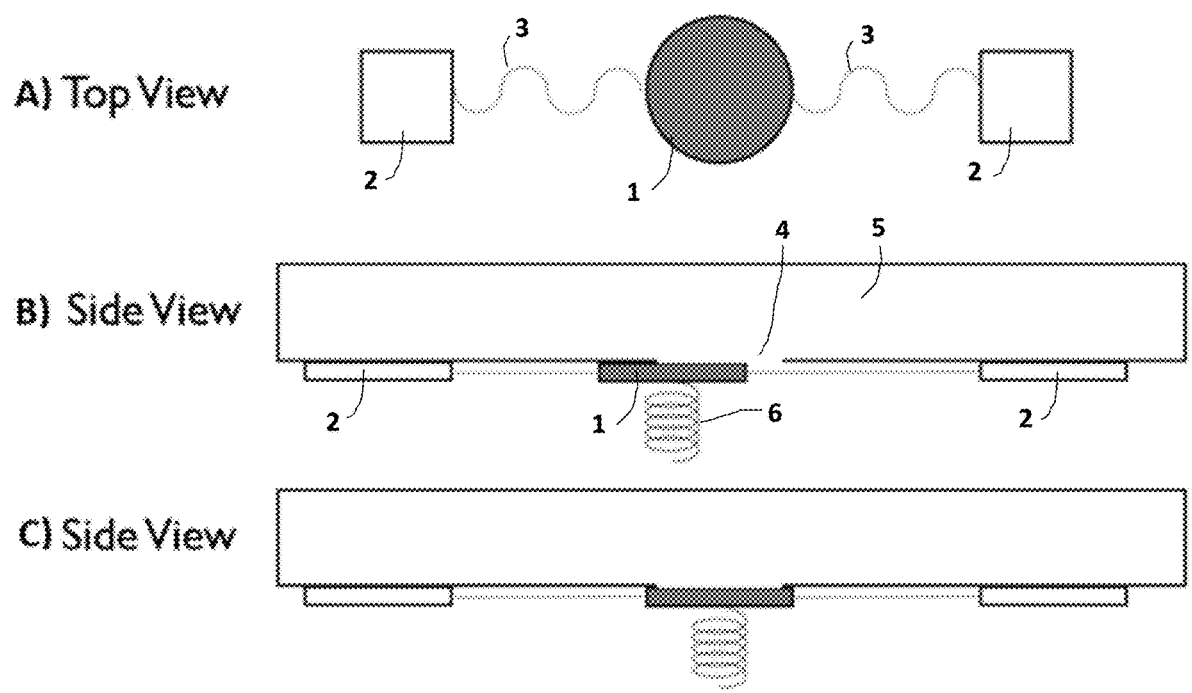
FIG. 1 shows a simplified schematic drawing of an SMA actuator according to an embodiment.

Various apparatuses or processes will be described below to provide example embodiments. No embodiment described below limits any claims and any claim may cover elements that are not described in each, all or any embodiment. The claims are not limited to elements of any one embodiment described below or to elements common to multiple or all of the embodiments described below. The applicants, inventors or owners reserve all rights that they may have in any elements disclosed herein whether or not claimed, for example the right to claim in a continuing application and do not intend to abandon, disclaim or dedicate to the public any elements by disclosure in this document.

Generally speaking, embodiments herein provide a shape memory alloy (SMA) actuator capable of operating at temperatures higher than 65° C. (in some cases, capable of operating at temperatures over 100° C.) while sustaining actuator properties but remaining cost effective and suitable for working with an electrical connection. Several embodiments involve an actuator that is used to controlling flow (either fluid or gas) through a passageway for the purpose of describing various features, however, it will be understood that the present disclosure is not limited to actuators acting as a valve to control flow. Embodiments of actuators herein may be used or adapted as would be understood by one of skill in the art for various high temperature actuation applications.

As noted above, shape memory alloys formed of nickel (Ni) and titanium (Ti) form a shape memory alloy called NiTi. Further, the addition of a ternary alloying element, such as Pd, Au, Pt, Hf and Zr, typically at levels >10 at. %, can provide for a higher transformation temperature of the NiTi alloys. Unfortunately, achieving these levels of the ternary alloying element can be cost prohibitive and can impact work output. As explained in further detail below, it has been determined that laser treatment can result in a higher at. % concentration of the ternary alloying element, relative to the Ni and Ti, in a predetermined portion of the actuator. This will result in a higher transformation temperature at that portion of the actuator and allow the operation to be limited to that higher temperature or the like. In particular, the ternary element can be selected and processed based on predetermined operating temperature required for the actuator. In some cases, the ternary element may be Hafnium (Hf). In some cases, the actuator may have a Hafnium content of 13 at. % but have a predetermined portion treated/processed to increase the local Hafnium concentration to provide a transformation temperature above what would be typical for Hf NiTi at 13 at. %. The examples herein tend to refer to Hafnium but it will be understood that similar processing can be adapted for other ternary elements selected from those that provide higher transformation temperatures, such as, at least, Pd, Au, Pt, and Zr.

FIGS. 1A, 1B, and 1C show simplified schematic drawings of an SMA actuator according to an embodiment.

The SMA actuator 3 may be cut from a single sheet of SMA material. The valve seat 1 is connected to two connector pads 2, one on each side. The valve seat 1 and connector pads 2 are connected by an actuating region 3, which may be laser processed to exhibit differing properties from the rest of the material.

In this design, the actuating region 3 is cut into an s-shaped two-dimensional spring, which reduces the strain required for the same amount of displacement compared to a straight actuating region 3.

The connector pads 2 are each connected to an electric circuit, with the valve seat 1 grounded. When current is supplied to one of the connector pads 2, the actuating region 3 on the corresponding side will contract, causing the valve seat 1 to displace and allowing air to pass through an orifice 4 and into or out of an air chamber 5 (as shown in FIG. 1B). When current is supplied to the other connector pad 2, the actuating region 3 on the corresponding side will contract, causing the valve seat 1 to displace and cover the orifice 4 (as shown in FIG. 1C). In some cases, a biasing member 6, such as a stainless steel compression spring, or the like may be included to supply a force on the valve seat 1 to create a stronger seal against the orifice 4.

In order to reduce wear due to sliding on surfaces, a material selection of the mating surface on the air chamber 5, using something such as Teflon® or a soft silicone material.

Figure 2:
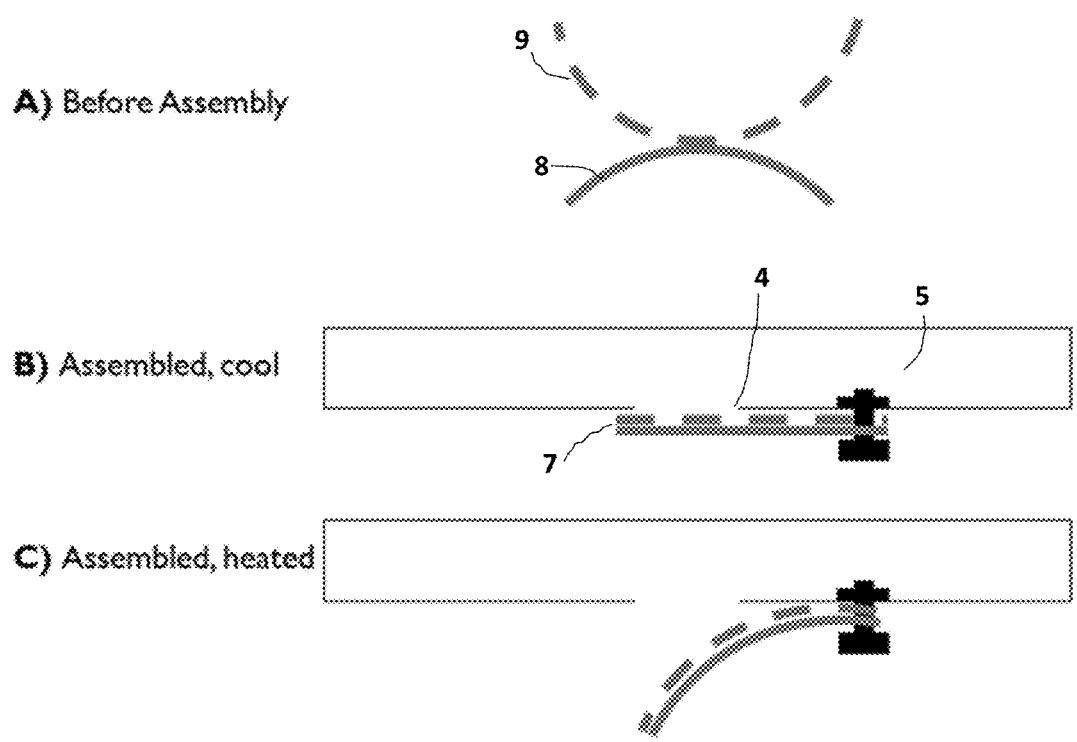
FIG. 2 shows a simplified schematic drawing of another SMA actuator according to an embodiment.

FIGS. 2A, 2B and 2C show simplified schematic drawings of another SMA actuator according to an embodiment.

The valve 7 can be made of an SMA sheet 8 and a biasing member 9, which may be made of another metallic material such as stainless steel or the like. The SMA sheet 8 can be shapeset such that before it is assembled and when it is in its austenitic phase, the sheet is curved.

The biasing member 9 is also curved, and attached to the SMA sheet 8 such that the direction of the curves are opposing one another. The SMA sheet 8 and biasing member 9 may be attached by an adhesive, laser welding, a mechanical interface, or any other means of securement.

Once assembled (as shown in FIG. 2B), the opposing curves result in a balance of forces that keeps the valve 7 closed against the orifice 4. To further improve sealing between the valve 7 and the orifice 4, the biasing member 9 may have a more pronounced curve such that the result is a higher force exerted against the orifice 4.

In the cooled state, i.e. when the SMA sheet 8 is in the martensitic phase, the valve 7 remains closed and no air enters/exists the air chamber 5. When current (or any other method of heating above the austenitic transformation temperatures) is supplied to the SMA sheet 8, the valve 7 curves downwards as the SMA exhibits the shape memory effect, allowing air to pass through an orifice 4 and into or out of an air chamber 5 (as shown in FIG. 2C).

Figure 3:
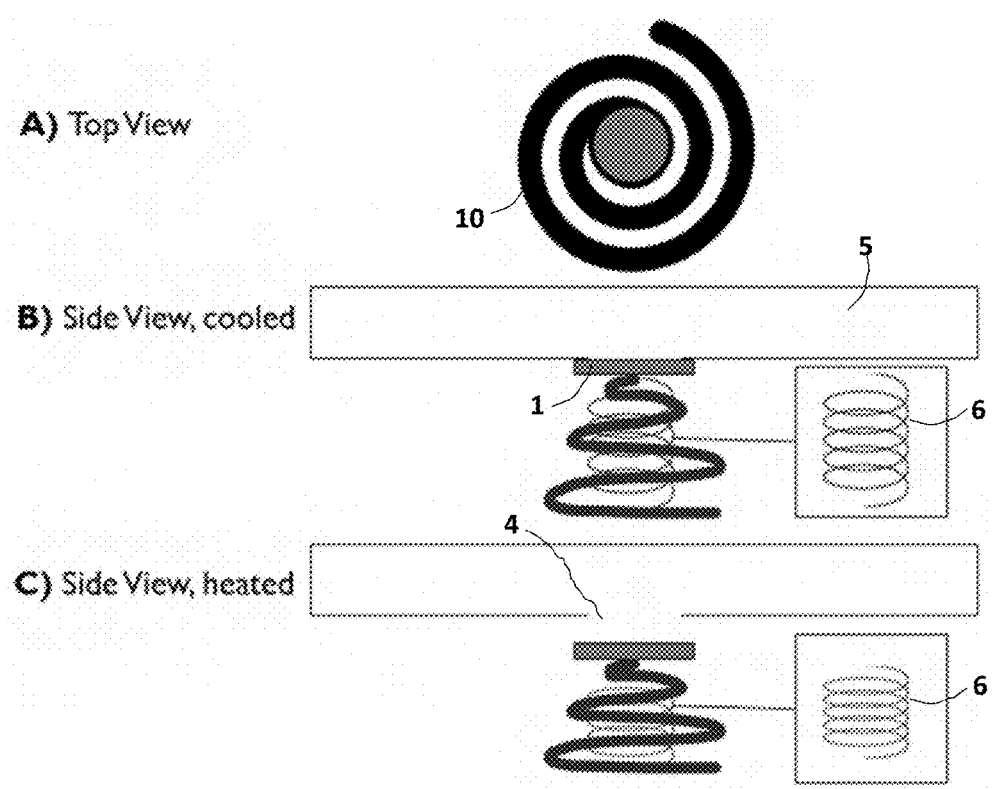
FIG. 3 shows a simplified schematic drawing of another SMA actuator according to an embodiment.

An advantage of this design is a high cycle life due to very low strain. A potential limitation of this design is that for certain applications, it may be difficult to achieve an adequate sealing force FIG. 3 shows a simplified schematic drawing of another SMA actuator according to an embodiment.

The SMA actuator 10 may be cut from a single sheet of material. In some cases, the valve seat 1 may be the same material and in others it may be a different material. The SMA actuator is a SMA spring 10, cut in a spiral shape, and a valve seat 1.

When the SMA spring 10 is in the cooled, martensitic phase, the valve seat 1 seals against the orifice 4 by a force applied from a biasing member 6, such as a stainless steel compression spring (as shown in FIG. 3B). The SMA spring 10 may be laser processed to exhibit differing properties from the rest of the actuator. When heated, the SMA spring 10 will contract, overcoming the force of the biasing member 6, causing the valve seat 1 to displace and allowing air to pass through an orifice 4 and into or out of an air chamber 5 (as shown in FIG. 3C).

Similar to the previous embodiment, an advantage of this design is a high cycle life due to very low strain.

Figure 4:
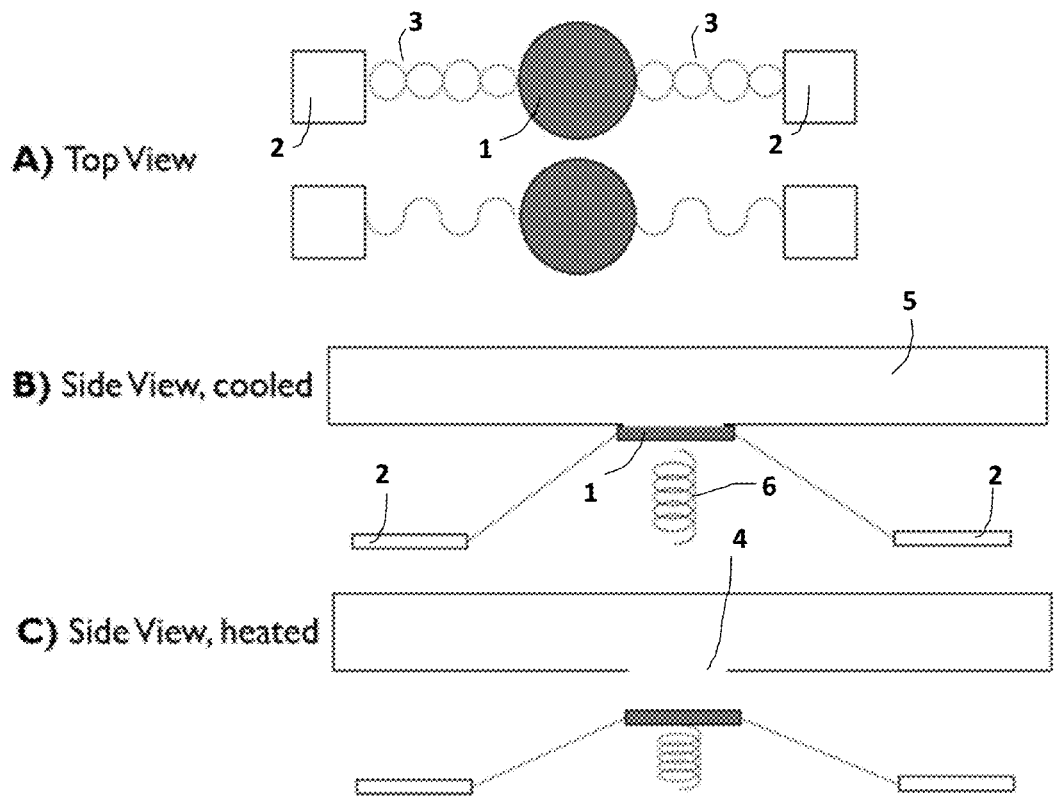
FIG. 4 shows a simplified schematic drawing of another SMA actuator according to an embodiment.

FIG. 4 shows a simplified schematic drawing of another SMA actuator according to an embodiment.

The SMA actuator shown in FIG. 4A may be cut from a single sheet of material. This design is similar to that disclosed in FIG. 1, with the valve seat 1 connected to two connector pads 2, which are connected by two actuating regions 3.

Two geometries for the actuating region 3 are disclosed, the s-shaped design as previously disclosed in FIG. 1 and an o-shaped design. Various other geometries may be utilized such as an oval-shaped design, a diamond-shaped design, or combinations thereof, to reduce localized strains and balance actuation forces.

Whereas the design disclosed in FIG. 1 actuates horizontally relative to the air chamber 5 to seal or expose the orifice 4, in this design the actuating region 3 actuates to move the valve seat 1 vertically relative to the air chamber 5.

When the actuating region 3 is in the cooled, martensitic phase, the valve seat 1 seals against the orifice 4 by a force applied from a biasing member 6, such as a stainless steel compression spring (shown in FIG. 4B). The actuating region 3 may be laser processed to exhibit differing properties from the rest of the actuator.

When heated (for example by resistance heating or the like) to a transformation temperature, the actuating region 3 will contract, overcoming the force of the biasing member 6, causing the valve seat 1 to displace and allowing air to pass through an orifice 4 and into or out of an air chamber 5 (shown in FIG. 4C).

Figure 5:
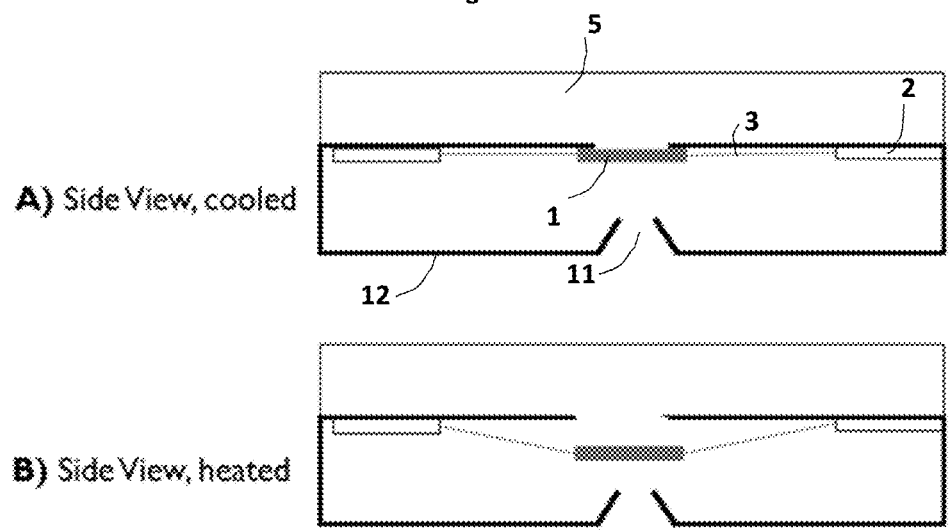
FIG. 5 shows a simplified schematic drawing of another SMA actuator according to an embodiment.

FIG. 5 shows a simplified schematic drawing of another SMA actuator according to an embodiment.

FIG. 5 shows an alternative for using an additional biasing member. In this design, the pressure from air entering through the air inlet 11 provides the force to keep the valve seat 1 sealed against the orifice 4 in the cooled, martensitic state (shown in FIG. 5A).

A housing 12 surrounding the SMA actuator and sealing with respect to the orifice 4 is intended to ensure that the air inlet 11 side of the valves remains at high pressure relative to the air chamber 5, keeping the valve seat 1 sealed against the orifice 4.

When heated to an appropriate level, the actuating region 3 will contract, overcoming the pressure from the air, causing the valve seat 1 to displace and allowing air to pass through an orifice 4 and into or out of an air chamber 5 (shown in FIG. 5B).

Figure 6:
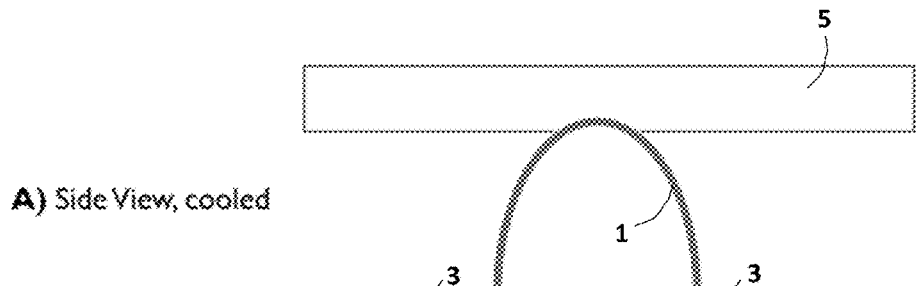
FIG. 6 shows a simplified schematic drawing of another SMA actuator according to an embodiment.
Figure 6:
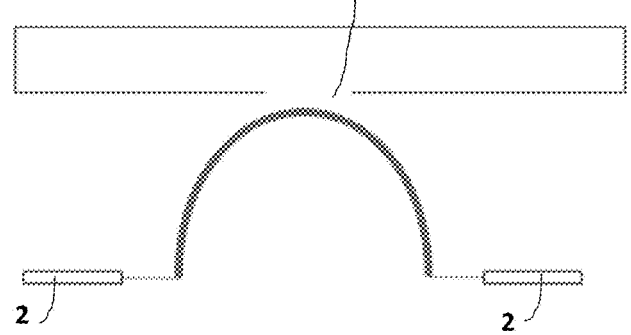

FIG. 6 shows a simplified schematic drawing of another SMA actuator according to an embodiment.

Similar to the embodiment of FIG. 1, the valve seat 1 is connected to two connector pads 2, which are connected by two actuating regions 3. Similar to other embodiments, the actuating region can be made of the SMA, however both the valve seat 1 and connector pads 2 may be made of other materials, reducing the amount of SMA required and the overall cost of the actuator. Generally speaking, the connector pads 2 may be any electrically conductive material, in some cases the valve seat 1 may also be electrically conducting.

The valve seat 1 material can be stiff enough to provide a seal against the orifice 4 and a biasing force for the actuating regions 3 (shown in FIG. 6A), while also being able to bow during actuation.

The connector pads 2 are each connected to an electric circuit and can be rigidly mounted. When current is supplied, the actuating regions 3 contract, causing a pulling force on the valve seat 1 in both directions and breaking the seal between the valve seat 1 and orifice 4 (shown in FIG. 6B).

An advantage of this design is that the valve seat 1 biases the actuating regions 3, so no additional biasing member is generally required. A potential challenge with this design is the method of securement between the actuating regions 3 and the valve seat 1. This may be solved by using SMA wire rather than sheets for the actuating regions 3 and feeding them through a hole in the valve seat 1 and crimping them, or by using a lock and key type geometry, where a key like geometry is cut on the SMA sheet actuating regions 3, which mates and locks with a geometry cut on the valve seat 1. The SMA may also be mechanically fastened, laser welded, or secured by any other means of attachment.

Figure 7:
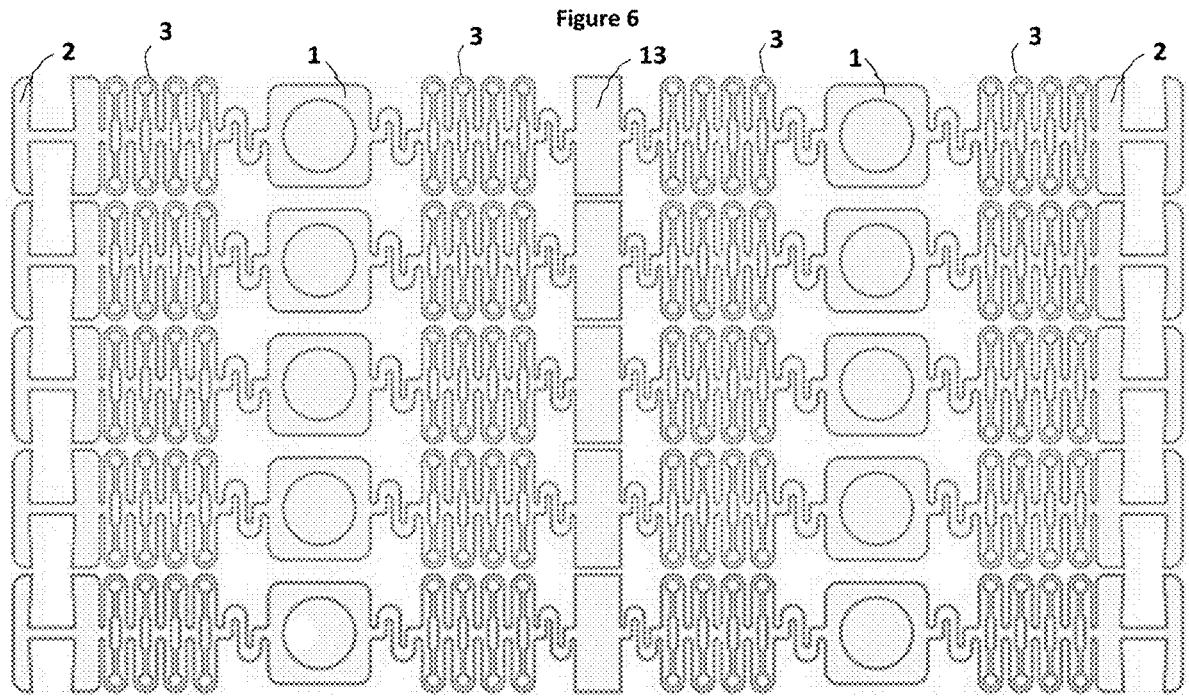
FIG. 7 illustrates how multiple SMA actuators according to an embodiment can be cut in a single sheet.

FIG. 7 shows a simplified schematic drawing of another SMA actuator according to an embodiment. In this case, FIG. 7 Illustrates how multiple SMA actuators can be cut in a single sheet, minimizing scrap, and improving the ease of assembly when more than one actuator is used in an application.

Similar to the previous embodiments, each actuator consists of a valve seat 1, connected to connector pads 2 on each side by actuating regions 3. Similar to other embodiments, the connector pads 2 can be designed such that they are able to create a mechanical and electrical connection with an electronic board, or any other component that it may be desirable to affix to, without the need for an additional component or intervention. For example, the connector pads 2 may fit into a simple slot cut in an electronic board, with the geometry of the pad cut such that once slid into the slot, the actuator will not move from its locked position.

This type of arrangement is intended to provide the necessary force to ensure a relatively rigid connection, while also providing the contact required for an electrical connection. If multiple actuators are cut beside one another, a common connector pad may be utilized in the form of a single grounding pad 13. If multiple actuators are above and below one another, the grounding pads 13 may be connected to form a single piece for each set of actuators (not shown).

FIGS. 8A, 8B, and 8C show simplified schematic drawings of another SMA actuator according to an embodiment.

The actuator shown in FIG. 8A is similar to that disclosed in FIG. 7, with a slightly modified connector pad 2 geometry and valve seat 1 geometry.

FIG. 8B shows the configuration of the actuator in its assembled position, whereby the connector pads 2 are connected to an electric circuit and the valve seat 1 moves down when a current or other heating source is applied. A side view is shown in FIG. 8C FIG. 9 shows an electrical schematic for an embodiment of a printed circuit board used to control an actuator according to an embodiment.

The board may be powered by a battery or other power source, though if powered by a constant voltage source such as a battery, a current limiter circuit can be used such that constant current is supplied to the actuators to accurately control their resistance heating.

In FIG. 9, ten MOSFETs (M1-M10) are intended to be used to individually control the switching of ten actuators (A1-A10). It will be understood that the board may be able to control any number of actuators by simply adding or removing MOSFETs and actuators. Alternatively, if the application requires more than one actuator to fire at the same time, more than one actuator may share a single MOSFET to decrease the complexity of the board as applicable.

Pulse width modulation (PWM) can be used to precisely control the current supplied to the actuators and to prevent the actuators from overheating.

FIG. 10 is a chart showing data for the martensitic finish temperatures, ultimate tensile strength and strain to failure of different materials/processing methods.

In a method to make the actuators described herein, a laser processing method such as that in U.S. Pat. No. 10,047,421B2 to Khan can be used to adjust (increase) the local concentration of, for example, 13% at. % Hf NiTi to be higher than that of, for example, 20% Hf NiTi such that the transformation temperature is also increased, further improving the ability to operate at high temperatures and reducing the cost (13% Hf NiTi is less costly than 20% Hf NiTi and if an actuator can be configured to operate at the same higher temperature ranges, the cost can be reduced significantly). It will be understood that the particular at. % content will be determined based on, for example, ternary element, desired transformation temperature, cost factors, processing capability, and the like. For the example of Hafnium, a 7 at. % difference was produced and had a significant effect.

A reduced concentration of Hf in the alloy generally is also intended to make bonding to connectors easier and more cost efficient while still providing a higher transformation temperature in predetermined areas involved in actuation. In this way, localized regions (predetermined regions of the material may be treated separately) can be managed or optimized to operate at elevated temperatures, while other regions may maintain mechanical and thermal properties of the base material before processing, resulting in improved performance and a reduced cost.

Figure 11:
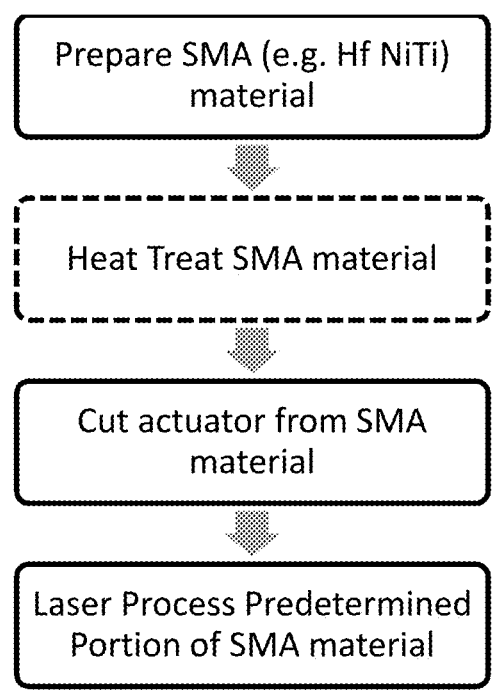
FIG. 11 is a flowchart of an embodiment of a method for making an SMA actuator.

FIG. 11 is a flowchart illustrating an embodiment of a method of making an actuator of the type described above. Initially, an SMA material (such as an Hf NiTi material) is prepared in a known manner. In some cases, the SMA material may be heat treated. The actuator may be cut from the SMA material (typically using a cutting laser or the like) at this point or after or in conjunction with the laser processing process. A predetermined portion or area of the SMA material is then laser processed in a manner similar to that described in U.S. Pat. No. 10,047,421 to Khan. In particular, the process is adjusted to allow/account for the presence of Hf in the SMA material and to adjust the predetermined portion to have an adjusted or predetermined content of Hf, Ni, Ti, (relative content or amount of each element) in the predetermined portion such that the transformation temperature is adjusted. Following processing and/or cutting, the actuator can go through additional processing steps as will be known to one of skill in the art or be put to use.

Embodiments herein are intended to provide a cost-effective and efficient SMA actuator for higher temperature applications but at lower cost. Embodiments of the actuators and method of making are intended to make use of or have at least one of the following features:

Laser processing NiTiHf sheets to locally increase the relative amount of Hf (able to make 13 at. % Hf behave like 20 at. % Hf for a fraction of the cost);

Using local laser processing to tune the material properties as required (i.e. transformation temperatures, mechanical properties, force output);

High precision (femtosecond) laser cutting to yield useful geometries in the micrometer scale;

Mechanical locking system to secure to electronic control board;

Monolithic component conducting multiple functionalities through various embedded elements, including but not limited to latching, sealing, heat sinking, actuating and self-biasing elements;

A monolithic actuator that can be antagonistic or self-biased in a 1D, 2D and/or 3D orientation;

An actuator with high frequency capabilities through the use of either, or both, high temperature alloys and built in heat sinks;

Selective tuning of actuating sections to enable local actuation based both active and passively; and As cut actuator with final geometry without the need for shape setting in an inert environment.

In the preceding description, for purposes of explanation, numerous details are set forth in order to provide a thorough understanding of the embodiments. However, it will be apparent to one skilled in the art that these specific details may not be required. It will also be understood that aspects of each embodiment may be used with other embodiments even if not specifically described therein. Further, some embodiments may include aspects that are not required for their operation but may be preferred in certain applications. In other instances, well-known structures may be shown in block diagram form in order not to obscure the understanding. For example, specific details are not provided as to whether the embodiments described herein are implemented as a software routine, hardware circuit, firmware, or a combination thereof.

Embodiments of the disclosure or elements thereof can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with other modules and elements, including circuitry or the like, to perform the described tasks.

The above-described embodiments are intended to be examples only. Alterations, modifications and variations can be effected to the particular embodiments by those of skill in the art without departing from the scope, which is defined solely by the claim appended hereto.

We claim:

1. A shape memory actuator comprising:
   a valve seat;
   a set of connector pads; and
   a set of actuating regions located between the valve seat and the set of connector pads connecting the valve seat to each of the set of connector pads;
   wherein the set of actuating regions are made from:
   a nickel-titanium (NiTi) alloy; and
   a ternary element provided to the nickel-titanium alloy such that the content of the ternary element is selected and processed based on a predetermined operating temperature for the actuator.

2. A shape memory actuator according to claim 1, wherein the ternary element is Hafnium (Hf).

3. A shape memory actuator according to claim 2, wherein the nickel-titanium alloy has a relative Hafnium content of 13 at. % and is processed to increase the transformation temperature above what would be typical for Hf NiTi at 13 at. %.

4. A shape memory actuator according to claim 2, wherein the alloy has a relative Hafnium content of 13 at. % and is processed to increase the local relative Hafnium content in a predetermined portion of the alloy to above 20 at. %.

5. A shape memory actuator according to claim 1, wherein the ternary element is selected from at least one of lead (Pd), Gold (Au), Platinum (Pt), Hafnium (Hf) and Zirconium (Zr).

6. A shape memory actuator according to claim 1, wherein the NiTi alloy is bonded to electrical contacts by a mechanical connection.

7. A shape memory actuator according to claim 6, wherein the mechanical connection is crimping.

8. A shape memory actuator according to claim 1 wherein the valve seat and the set of connector pads are not in direct contact with each other.

9. A shape memory actuator according to claim 1 wherein each of the set of actuating regions are directly connected to the valve seat.

* * * * *